United States Patent [19]

Lenderink

[11] Patent Number: 5,194,310
[45] Date of Patent: Mar. 16, 1993

[54] WOOD SURFACED FOLDABLE FLEXIBLE SHEET

[76] Inventor: Thomas A. Lenderink, 1271 House St., N.E., Belmont, Mich. 49306

[21] Appl. No.: 481,584

[22] Filed: Feb. 20, 1990

[51] Int. Cl.$^5$ ............................................. B32G 3/00
[52] U.S. Cl. ...................................... 428/90; 428/176; 428/118; 428/154; 160/84.1; 160/168.1
[58] Field of Search ........................... 160/84.1, 168.1; 428/90

[56] References Cited

U.S. PATENT DOCUMENTS 2,829,081  4/1958  Sweem ................................. 160/84.1
4,931,342  6/1990  Tolbert et al. ....................... 160/84.1

Primary Examiner—Patrick J. Ryan
Assistant Examiner—Kam Lee
Attorney, Agent, or Firm—Price, Heneveld, Cooper, DeWitt & Litton

[57] ABSTRACT

A sheet-like, foldable material is provided by laminating a very thin film-like veneer of material wood veneer to a thin backing material of paper or plastic by use of a bonding material which does not harden and can therefor be stretched and folded without causing rupture of the fibers of the wood veneer.

14 Claims, 1 Drawing Sheet

WOOD SURFACED FOLDABLE FLEXIBLE SHEET

FIELD OF THE INVENTION

This invention relates to foldable, thin, sheet materials and particularly to such a material consisting of a single lamina of wood bonded to a sheet of synthetic resin, paper or fabric which is capable of being used as a stock on which information can be printed and which, depending on the backing material, can be folded and used in the same manner as an ordinary sheet of writing or art paper. It can also be used for numerous other applications in which a natural wood-faced, two-lamina, decorative, sheet-like material is desired.

BACKGROUND OF THE INVENTION

It has long been recognized that, if the natural beauty of wood could be incorporated into thin materials capable of being printed, folded and otherwise used in basically the same manner as paper, the result would be a very attractive product for a number of uses. Heretofore, many attempts have been made to simulate such a product by printing a reproduction of wood grain on a paper or plastic medium and, in some cases, this effort has produced a quality reproduction of the fine details of natural wood. However, the result is a simulated product which lacks the total appearance and feel of actual wood.

The problem with wood has always been that, unless it is cut to a web of such reduced thickness that it can be bent under normal circumstances in a manner similar to paper, the wood fibers are ruptured and, thus, the fold line appears as a break in the resulting material. Modern techniques of cutting sheets of veneer stock from a log have reached a point where such sheets can be cut with consistent quality and without rupture to a thickness of approximately 0.003-0.006 without tearing or otherwise creating defects. New cutting techniques create a veneer lamina which might be termed a "wood film" produced by such cutting. Veneer of this type, however, is fragile and, in order to preserve it, it must be supported by a stress absorbing and resisting backing. Particularly important is providing a flexible, tension resistant backing to support the veneer lamina against tension applied transversely of the wood grain. This invention has found a solution to that problem and, as a result, has produced a material which, in effect, combines the foldability of writing paper with a surface that is actually a thin film of a natural wood.

DESCRIPTION OF THE INVENTION

The invention provides a new sheet material having a face consisting of a micro-thin veneer film of natural wood bonded to and supported by a thin film of a backing material, which film is flexible, strong and capable of multiple flexure without stretching or fatigue. This backing could be a web of paper, synthetic resin or other suitable, flexible sheet-like material. The adhesive by which the film and the veneer film are bonded together is one which is capable of repeated flexing about a very small radius without failure of the adhesive and, thus, separation of the veneer from the backing lamina. The invention provides such a product in which the lamina of wood may be any one of a substantial number of species with the limitation, however, that some species are more capable than others of being bent over a small radius or of being repeatedly flexed about such a radius. The invention has the advantage not only of providing an entirely new flexible, sheet-like medium but, also, a medium which accomplishes its decorative affect with the use of a minimal quantity of wood veneer thus, both reducing cost and increasing the use effectiveness of our timber resources. Both of these are of increasing importance in our present economy.

DESCRIPTION OF THE PREFERRED EMBODIMENT

The material of this invention, from which a wide variety of products can be fabricated, is a two-layer laminate which is capable of use in substantially the same manner as the known heavy-duty paper or plastic products on which there has been printed a simulated wood grain design. The invention, for the first time, permits a natural wood layer to be bent 180° over a fold line without normally producing a visible rupture transverse to the wood grain and also to be bent repeatedly over such a fold line extending in the general direction of the grain of the natural wood lamina.

Figure 1:
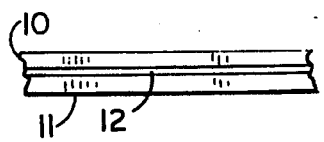
FIG. 1 is an enlarged, fragmentary, cross section of the laminate of this invention.

FIG. 1 illustrates the construction of the sheet material of this invention. A face lamina 10 of wood veneer having a thickness of about 0.003-0.008 inch is bonded to a backing film 11 of 0.002 thickness polyester film. Other materials can be used for the backing film 11. The bonding is effected by a layer 12 of a suitable pressure sensitive adhesive or of a thermoplastic or a thermosetting plastic. The bonding of such a wood veneer layer to a plastic film or sheet is routinely practiced in the laminating field. An exemplary product produced by this invention is one in which a lamina of 0.004 inch of wood is bonded to 0.003 inch of film or to 0.012-0.014 inch of special paper such as that known as "Tagstock". It is also known to the laminating art to bond a sheet of plastic film to a natural wood lamina, including the manufacture of products in which some flexing of the resulting product can be expected in the normal use of the resulting product. Experience indicates that a suitable bonding material for this purpose is a dual-faced 1 mm clear plastic film manufactured by Fasson Specialty Division, 250 Chester Street, Painesville, Ohio 44077, under the name of "FasCal 700". There are other types and sources of suitable bonding material. It is important that the adhesive used for this purpose never becomes rigid since rigidity of the bonding material would prevent flexing and folding of the resulting sheet material.

The functional characteristics of the bonding material are very important. Particularly is this so in products which are expected to be repeatedly flexed in the course of their normal usage. The bonding material must maintain its ability to effectively hold together the thin wood veneer and the backing material during repeated flexing, and this characteristic must be retained over the reasonable life span of the product which could be years. For certain applications, this capability must be maintained even under circumstances in which the material is repeatedly subjected to such deteriorating environmental phenomena as moisture, sunlight and cold temperatures. To the extent that tests of these characteristics have been possible at this point in time, it is believed that the bonding agent set out above can accomplish this objective.

The lamina film material which has been described above has a number of applications. One such use is as stationery. It has been found that several species of wood lamina, without special treatment of the wood lamina to prevent spread of the ink or ink-like impression, can be used as stationery. This has been established as true for such wood species as hard maple, eastern red cedar and birch. Stationery using this invention can be folded for mailing in a conventional envelope and opened and read by the recipient without visual deterioration of the wood surface veneer when the stationery utilizes a 0.004 inch wood veneer bonded to a 0.002 inch polyester film backing by means of the FasCal 700 adhesive noted above, for example. The stationery can also be made by bonding together two 0.004 inch wood lamina.

Figure 2:
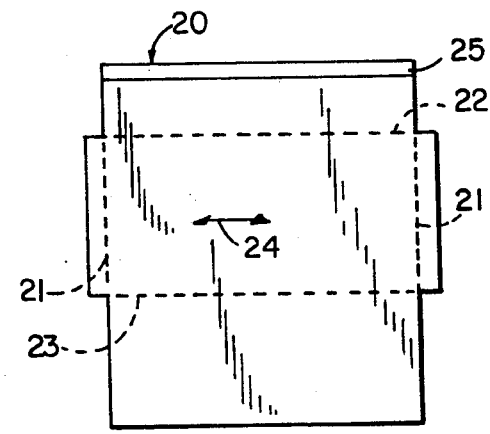
FIG. 2 is a blank for an envelope incorporating this invention.

The envelope 20 (FIG. 2) for this correspondence can be of the same materials, that is a 0.004 inch wood veneer bonded to a 0.002 inch synthetic resin film, such as polyester, or to a kraft or other type paper backing, including folding transversely of the wood grain A at the sides along the lines 21 in addition to the folding along the top and bottom fold lines 22 and 23 parallel to the grain 24 of the wood fiber. Using a construction in which the internal lamina is a 0.002 inch film of synthetic resin, the envelope is of the same or less weight than a conventional, all paper envelope. Because of the internal synthetic resin plastic lamina, it has the structural strength and durability of the conventional, paper envelope. Because the bonding between the wood lamina and the plastic film lamina is permanent, only destruction of the envelope as a whole will cause the identification of its addressee to be lost. The envelope can be sealed in the usual manner by a conventional moisture-activated adhesive 25 or the like. If desired, paper can be substituted for the polyester film.

It will be recognized that the stationery to be placed in the envelope can be manufactured of the same materials as the envelope and, of course, can be folded for insertion in the envelope. It is important to the cost of the materials utilized by this invention that the veneer lamina can be so cut that no sanding is necessary to provide a surface on which indicia can be printed or written.

It has been determined that stationery incorporating this invention can be utilized not only in a conventional typewriter but also in machines utilizing xerographic image reproduction as well as in ink jet and laser image producing machines. It has also been established that when certain wood species are used that it can be printed in the same manner and with the same equipment as writing paper. It will be recognized that if a species of wood is utilized which is not itself capable of receiving an impression made by ink or ink-like materials without wicking of the ink, the surface of the wood can be treated in the same manner as paper to overcome this problem by surface treatment of the wood with a sealant, such as lethecin, derived from soybeans.

In the practice of this invention, it is possible to use wood lamina produced by either slicing or rotary cutting of the log. It will be recognized that only the rotary cut lamina can be produced as a continuous sheet. The two types of cutting produce two different appearances due to the direction the cutting knife crosses the wood grain. This, however, is a matter of the ornamental appearance of the finished product rather than its utility for this invention.

Figure 4:
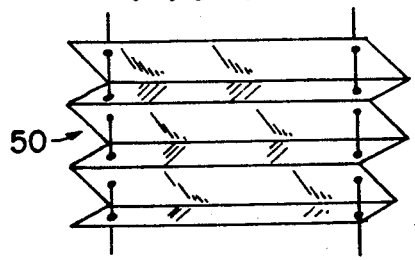
FIG. 4 is a fragmentary view of a sheet incorporating this invention after it has been folded to form a blind.
Figure 5:
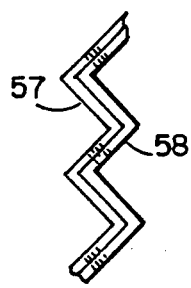
FIG. 5 is an enlarged, fragmentary cross-sectional view of the blind illustrated in FIG. 4.
Figure 3:
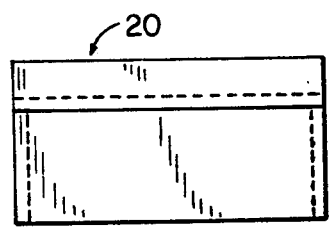
FIG. 3 illustrates the envelope shown in FIG. 2 after folding.

The lamina materials similar to that from which envelopes or the like can be made using this invention is usable for making a number of other products. Among those to which it has been applied, is a Verisol type blind or window covering 50 (FIGS. 4 and 5). It is an important facet of this invention that a blind having plural, but not individual, slats or louvers is possible using this invention. The blind consists of a sheet of 0.003-0.007 rotary or slice cut, wood veneer bonded to a sheet of polyester film of approximately 0.002 inch thickness by means of the same FasCal 700 adhesive heretofore identified and used for products which can be expected to be subject to flexing. Other specialty adhesives including liquid adhesives can be used. A stock from which the blinds can be made can be a length of veneer wood rotary cut from a log and thus, can be a long web similar to a roll of paper. Since the veneer is peeled by rotating the log, the width of the veneer sheet or web is governed by the length of the log which can be enough to make more than one blind from a single width of veneer stock. Since the blind is to have transverse folds, the wood grain direction will be transverse of the blind. The sheet of veneer 57 is preferably bonded to the backing material 58 and the resulting sheet slit lengthwise to the desired blind width. The backing material 58 can be a plastic film or it can be a high strength kraft-type paper material. In this condition, the dual component sheet stock can be coiled without slitting to any width stored in rolls to be further processed when needed.

The resulting web consisting of the veneer bonded to the backing film can then be cut to the width of the blind for which it is to be used. After cutting, the web is processed to form the bends in the panel which define the individual slat-like sections from each other. In doing this, it is important that these bends between the slat-like portions extend parallel to the wood grain to avoid rupture of the wood fibers as the result of repeated flexing. To make these bends, the sheet is folded over a mandrel having a rounded nose, for example, of approximately 0.012 inch radius. This forms a crease in the web with the equipment forming the crease progressively to permit the wood fibers to stretch and the bonding material to allow for at least a small degree of slippage between the wood veneer and the backing film and thus allow the two webs to adjust to the formation of the radius. The resulting panel can be used as so formed or it may have holes formed in it for cords whereby it can be retracted by folding in a manner similar to a Venetian blind.

The backing film may be clear or opaque, depending upon the circumstances of use. It can be varied from basically translucent to opaque. Thus, if an opaque product is required, an opaque backing material 57 is selected However, if the decorative effect of backlighting the wood grain is desired, this can be accomplished by the use of a clear transparent backing film capable of allowing the thin wood veneer to admit subdued light through the thin and thus, largely translucent, natural wood grain lamina. Because of the thinness of the wood lamina, this produces a new decorative effect. This type of translucency has not heretofore been achieved in the manufacture of this type of product, using actual wood. At the same time, the invention permits the user to entirely retract the blind without adverse affect to the blind's structure or function.

The material either with an opaque or clear backing lamina can also be used as a decorative substitute for the conventional roller shade since the flexing will be parallel to the grain and can always be designed to be over a radius which will not strain the plastic film supported fibers because of the thinness of the veneer and the positive support of the plastic backing sheet.

Work with this product to this date indicates that dense hardwoods, such as, beech, sugar maple, white, yellow or gray birch, are particularly suitable for the manufacture of this product. However, softer woods, such as cedar and basswood, can also be used. The grain of the wood is very important because it has to resist separation and splitting, especially when folded over a line parallel to the grain.

Figure 6:
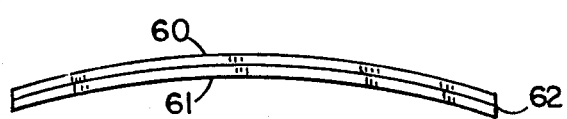
FIG. 6 is an enlarged, sectional view of a decorative strip such as a louver for a Venetian blind incorporating this invention.

The invention can also be applied to both horizontal and vertical slat or louver blinds or similar closure members having individual louvers. For manufacture of vertical or horizontal louvers, it is possible to create a lightweight louver having adequate rigidity by bonding a 0.003–0.012 inch thick lamina 60 of wood veneer to a metal backing 61 of 0.006–0.012 inch thick aluminum using as a bonding agent a 0.002 inch thick film 62 of a polycondensate resin type adhesive which permanently fuses the wood to the back lamina. A metal lamina for the product could be cross-sectionally bowed as illustrated in FIG. 6 to stiffen the louver. Depending upon length, a louver of this construction could be used either vertically or horizontally and almost any species of wood can be used since only slight bending of the wood lamina would be required.

It will recognized that, in making a product of this type, the veneer film can be cut in narrow strips either lengthwise or crosswise of the grain, bonded to the metal backing and the resulting strip cut to length using shearing equipment or cut off dies. At the same time, or as a separate step, the sides of the louver can be trimmed to precise width and the openings for the cords punched or otherwise formed in the louver.

If the grain of the veneer is to run transversely of the louver, the veneer sheet can be slipped into very long ribbons, each substantially the width of a louver and these bonded to the metal backing. The resulting laminated strip can then be trimmed, cut into louvers of the desired length and the cord openings punched in each individual louver.

Figure 8:
FIG. 8 is a cross-sectional view of a typical vertical louver of the panel illustrated in FIG. 7.
Figure 7:
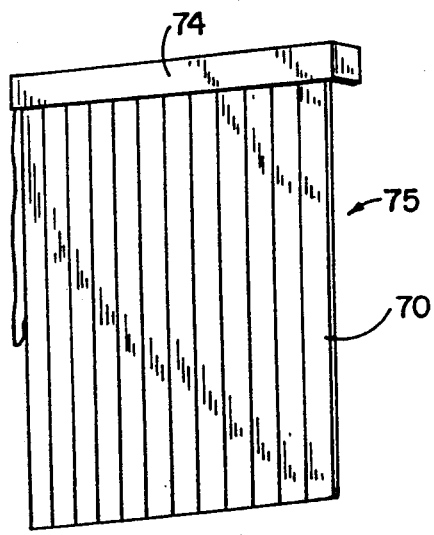
FIG. 7 is a panel of vertical louvers incorporating this invention.

For larger openings or other circumstances requiring a much wider or heavier louver such as would be necessary in an opening where there is potential for air movement which must be resisted, this invention makes possible natural wood surfaced louver inserts. In this case, the individual louver 70 of the louver assembly 75 (FIG. 7) includes a backing member 71 (FIG. 8). The backing member provides the strength and rigidity for the individual louver. The backing member 71 may be a section of formed or extruded plastic with forwardly extending inturned edges 72. Between the edges the louver provides a channel to receive a decorative dress strip 73 either by being inserted from one end or by being compressed to reduce its width until it can be passed between the inturned edges. The dress strip can be very similar to the construction shown in FIG. 6, that is, a thin, slightly convex strip of aluminum or steel to which a veneer of about 0.003–0.007 inch of wood has been bonded using a suitable bonding material such as a 0.002 inch thick acetate, dual-faced, bonding tape. Instead of the aluminum, the backing strip could be an extrusion of clear polyester or polystyrene or an opaque material. If the material of the backing strip is opaque, it may be provided with edges of a transparent material to render these edges substantially invisible. This concept is particularly useful in commercial applications where vertical louvers of 8, 10, 12, or more feet in length may be required. For this type of usage, the fact that the decorative dress strip or insert is very light is important because it does not materially contribute to the weight which must be supported. Furthermore, the decorative effect or theme can be quickly and easily changed by substituting a dress strip 73 of an entirely different appearance, such as changing the wood species from walnut to sugar maple. Because the dress strips are so thin and lightweight, they can be flexed sufficiently to detach them from the backing members 71 and the new ones substituted without the necessity for taking down or otherwise working with the remaining structure of the louver assembly. As is suggested in FIG. 7, this same concept can be utilized to give the same decorative appearance to a valence 74 concealing the support for drapes or the louvers previously described.

This construction not only has the advantage of providing the visual appearance of actual wood, it also permits the appearance of the structure to be changed as needed simply by substituting decorative panel strips of a different species of wood without having to change any of the remainder of the structure.

It is fundamental to all of the several aspects of this invention that it has been discovered that it is possible to use very thin sheets or webs of wood veneer bonded to a thin flexible backing web having high tear resistance and capable of being flexed either parallel to or transversely of the grain of the wood veneer using a bonding adhesive which is effective to bond the veneer to the thin flexible backing web yet capable of allowing minute but critical slippage between the wood lamina and the flexible backing lamina. This permits the composite web to be bent over a very small radius or to be flexed about a substantial radius without stressing the fibers of the wood lamina to the extent that the wood fibers are caused to tear or rip. This permits natural wood lamina to be used under circumstances for which they were considered wholly unsuited and prohibitively expensive. Because of modern methods of peeling the veneer, it is not necessary to sand or otherwise smooth the surface of the veneer.

This invention not only makes it economically feasible to provide the decorative appearance of real natural wood, it makes the available supply of decorative woods capable of much wider and diversified usage without increasing the rate of material depletion of that supply. As an example of this, the invention makes possible the decoration of a building wall with true natural wood by utilizing what amounts to a wallpaper consisting of the thin wood veneer bonded to a paper backing sheet which can be bonded to a wall surface in the same basic way as conventional wall paper. This is only an example of the possible application of a very thin, rollable, foldable, flexible laminate of very thin wood veneer and a flexible, high strength, thin backing web bonded together by an adhesive which never totally hardens and thus can and will tolerate minute displacement between the laminate when the resulting sheet product is flexed or folded.

Having described the preferred embodiment of the invention and various aspects of its application, it will be understood that modifications of the invention can be made without departing from its principles. Such modifications are to be considered as included in the hereinafter appended claims unless the language of the claims expressly states otherwise.

I claim:

1. A flexible foldable natural wood faced laminated sheet material comprising a lamina of natural wood veneer having a thickness in the range of 0.003 to 0.0055 inch and a lamina of a tear resistant flexible and foldable backing material having a thickness of 0.001 to 0.0025 inch, said wood lamina being bonded to one face of said backing lamina, the resulting laminated sheet material being capable of being folded at spaced intervals through a 180° arc about a radius of approximately 0.006 inch without a rupture of the wood lamina when the fold line lies in the same general direction as the grain of the wood.

2. A foldable wood faced laminated sheet material as described in claim 1 wherein said backing material is paper.

3. A foldable wood faced laminated sheet material as described in claim 1 wherein said backing material is a film of synthetic resin.

4. A foldable wood faced laminated sheet material as described in claim 3 wherein said synthetic resin film is polyester.

5. A foldable wood faced laminated sheet material as described in claim 3 wherein said synthetic resin film is an acetate.

6. A foldable wood faced laminated sheet material as described in claim 3 wherein the thickness of said wood lamina is 0.004 to 0.005 inch and the thickness of the resin film lamina is 0.001–0.002 inch.

7. A foldable wood faced laminated sheet material as described in claim 3 wherein the thickness of said wood lamina is 0.004 and the thickness of said film lamina is 0.002.

8. A foldable wood faced laminated sheet material as described in claim 3 wherein the bold between said film lamina and said wood lamina is provided by a pressure sensitive adhesive.

9. A foldable wood faced laminated sheet material as described in claim 3 wherein a second sheet lamina of natural wood is bonded to the other face of said synthetic resin film.

10. A sheet material as described in claim 1 wherein the sheet material is capable of having readable indicia printed on the wood surface thereof.

11. A laminate sheet as described in claim 10 for use in a typewriter or other indicia applying equipment.

12. An envelope of a foldable natural wood faced laminated sheet as described in claim 1 having the capability of being folded and sealed and of receiving and retaining legible imprints applied by a typewriter or other indicia applying equipment to its wood laminar surface.

13. A blind for covering a vertical area which blind is fabricated from a sheet of the wood faced laminated material described in claim 1 wherein the sheet material is formed into a plurality of parallel, connected louvers by fold lines about which repeated flexing of the sheet material can occur, said fold lines being such that at alternate fold lines the material is folded in a direction opposite to that in which it is folded at adjacent fold lines, said fold lines being formed by pressing against said sheet a die having a rounded nose the radius of which is approximately 0.006 inch with the die extending parallel to the grain of the wood and gradually causing the sheet material to be folded about the die at a rate which permits the wood lamina and the film of backing material to adjust to the stretching required by the folding without causing visible to the naked eye separation of the fibers of the wood.

14. A blind as described in claim 13 wherein the grain direction of the wood lamina can be transverse of the fold lines, sufficient time being provided during the folding for the wood fibers to stretch without rupture as the fold is formed.

* * * * *